United States Patent [19]
Kaczur et al.

[11] Patent Number: 5,296,108
[45] Date of Patent: * Mar. 22, 1994

[54] ELECTROCHEMICAL PROCESS FOR GENERATING CHLORINE DIOXIDE USING CHLORIC ACID-ALKALI METAL CHLORATE MIXTURES

[75] Inventors: Jerry J. Kaczur; David W. Cawlfield; Kenneth E. Woodard, Jr., all of Cleveland; Budd L. Duncan, Athens, all of Tenn.

[73] Assignee: Olin Corporation, Cheshire, Conn.

[*] Notice: The portion of the term of this patent subsequent to Jun. 29, 2010 has been disclaimed.

[21] Appl. No.: 919,813

[22] Filed: Jul. 24, 1992

Related U.S. Application Data

[60] Continuation-in-part of Ser. No. 765,078, Sep. 24, 1991, which is a division of Ser. No. 475,603, Feb. 6, 1990, Pat. No. 5,084,148.

[51] Int. Cl.$^5$ .............................. C25B 1/26; C01B 11/14
[52] U.S. Cl. ..................................... 204/95; 204/101; 423/477; 423/478; 252/187.1; 252/187.3
[58] Field of Search ............... 204/95, 101; 252/187.1, 252/187.3; 423/477, 478

[56] References Cited

U.S. PATENT DOCUMENTS

| | | | |
|---|---|---|---|
| 3,810,969 | 5/1974 | Schlumberger | 423/472 |
| 4,486,399 | 12/1984 | Lobley | 423/478 |
| 4,683,039 | 7/1987 | Twardowski et al. | 204/95 |
| 4,798,715 | 1/1989 | Hardee et al. | 423/478 |
| 4,806,215 | 2/1989 | Twardowski | 204/98 |
| 4,915,927 | 4/1990 | Lipsztajn et al. | 423/472 |
| 5,084,148 | 1/1992 | Kaczur et al. | 204/95 |
| 5,122,240 | 6/1992 | Cowley et al. | 204/101 |

Primary Examiner—John Niebling
Assistant Examiner—Brian M. Bolam
Attorney, Agent, or Firm—William A. Simons

[57] ABSTRACT

An aqueous solution of chloric acid and alkali metal chlorate is produced in an electrolytic cell having an anode compartment, a cathode compartment, and at least one ion exchange compartment between the anode compartment and the cathode compartment. The process comprises feeding an aqueous solution of an alkali metal chlorate to the ion exchange compartment, electrolyzing an anolyte in the anode compartment to generate hydrogen ions, passing the hydrogen ions from the anode compartment through a cation exchange membrane into the ion exchange compartment to displace alkali metal ions and produce an aqueous solution of chloric acid and alkali metal chlorate, passing alkali metal ions from the ion exchange compartment into the cathode compartment, removing the aqueous solution of chloric acid and alkali metal chlorate from the ion exchange compartment, and reacting the aqueous solution of chloric acid and alkali metal chlorate with a strong acid having a dissociation constant of $1 \times 10^{-4}$ or greater and a reducing agent to generate chlorine dioxide gas.

23 Claims, 3 Drawing Sheets

ELECTROCHEMICAL PROCESS FOR GENERATING CHLORINE DIOXIDE USING CHLORIC ACID-ALKALI METAL CHLORATE MIXTURES

This is a Continuation-in-Part Application of U.S. Ser. No. 07/765,078, filed Sep. 24, 1991 still pending, which is a division of application Ser. No. 07/475,603, filed Feb. 6, 1990, now U.S. Pat. No. 5,084,148 issued Jan. 28, 1992.

FIELD OF THE INVENTION

This invention relates to a process for producing chlorine dioxide from electrochemically produced chloric acid - alkali metal chlorate solutions.

BACKGROUND OF THE INVENTION

Chlorine dioxide has found wide use as a disinfectant in water treatment/purification, as a bleaching agent in pulp and paper production, and a number of other uses due to its high oxidizing power. There is a variety of chlorine dioxide generator systems and processes available in the marketplace. Most of the very large scale generators employed, for example, in pulp and paper production, utilize an alkali metal chlorate salt, a reducing agent, and an acid in a chemical process for producing chlorine dioxide. These generators and the processes employed also produce by-product salts such as sodium chloride, sodium sulfate, or sodium bisulfate. In pulp and paper mills, the typical by-product is sodium sulfate (saltcake) which is converted into a sulfur salt of sodium in a high temperature boiler and used in the paper process. Boilers require energy and the paper mills have a limited boiler capacity. Increasing the production of chlorine dioxide generally means increased capital investment to provide the added boiler capacity required to process the added amounts of saltcake by-product produced.

Thus a process which reduces the amount of a by-product salt, such as sodium chloride or sodium sulfate, produced while efficiently generating chlorine dioxide is commercially desireable.

U.S. Pat. No. 3,810,969 issued May 14, 1974 to A. A. Schlumberger teaches a process for producing chloric acid by passing an aqueous solution containing from 0.2 gram mole to 11 gram moles per liter of an alkali metal chlorate such as sodium chlorate through a selected cationic exchange resin at a temperature from 5° to 400° C. The process produces an aqueous solution containing from 0.2 gram mole to about 4.0 gram moles of $HClO_3$. This process requires the regeneration of the cationic exchange resin with acid to remove the alkali metal ions and the treatment or disposal of the acidic salt solution.

K. L. Hardee et al, in U.S. Pat. No. 4,798,715 issued Jan. 17, 1989, describe a process for chlorine dioxide which electrolyzes a chloric acid solution produced by passing an aqueous solution of an alkali metal chlorate through an ion exchange resin. The electrolyzed solution contains a mixture of chlorine dioxide and chloric acid which is fed to an extractor in which the chlorine dioxide is stripped off. The ion exchange resin is regenerated with hydrochloric acid and an acidic solution of an alkali metal chloride is formed.

In U.S. Pat. No. 4,683,039, Twardowski et al describe a method for producing chlorine dioxide in which the chlorine dioxide is produced in a generator by the reaction of sodium chlorate and hydrochloric acid. After separating chlorine dioxide gas, the remaining sodium chloride solution is fed to a three-compartment cell to form sodium hydroxide and an acidified liquor which is returned to the chlorine dioxide generator.

Each of the above processes produces a fixed amount and type of by-product salt.

M. Lipsztajn et al teach an electrolytic-dialytic process for producing chloric acid and sodium hydroxide from sodium chlorate. Chlorate ions are transferred through an anion-exchange membrane and sodium ions are passed through a cation-exchange membrane (U.S. Pat. No. 4,915,927, Apr. 10, 1990).

BRIEF SUMMARY OF THE INVENTION

Now a process has been discovered which permits variability in the composition of a chlorate solution used in chlorine dioxide generators. Further, the process permits a reduction in the amount of acid required and subsequently the amount of salt by-product produced in the chlorine dioxide generator. Still further, the process allows for the production of an alkali metal hydroxide as a valuable by-product or acidic solutions of alkali metal salts at reduced energy costs. In addition, the process results in the reduction of process steps and process equipment required for the production of chlorine dioxide.

These and other advantages are accomplished in a process for electrolytically producing an aqueous solution of chloric acid and alkali metal chlorate in an electrolytic cell having an anode compartment, a cathode compartment, and at least one ion exchange compartment between the anode compartment and the cathode compartment, characterized by feeding an aqueous solution of an alkali metal chlorate to the ion exchange compartment, electrolyzing an anolyte in the anode compartment to generate hydrogen ions, passing the hydrogen ions from the anode compartment through a cation exchange membrane into the ion exchange compartment to displace alkali metal ions and produce an aqueous solution of chloric acid and alkali metal chlorate, passing alkali metal ions from the ion exchange compartment into the cathode compartment, removing the aqueous solution of chloric acid and alkali metal chlorate from the ion exchange compartment, and, reacting the aqueous solution o chloric acid - alkali metal chlorate with a strong acid having a dissociation constant of $1 \times 10^{-4}$ or greater and a reducing agent to generate chlorine dioxide gas.

BRIEF DESCRIPTION OF THE DRAWINGS

More in detail, the novel process of the present invention and its application in producing chlorine dioxide can be carried out in the apparatus illustrated in the following FIGURES.

DETAILED DESCRIPTION OF THE DRAWINGS

Figure 1:
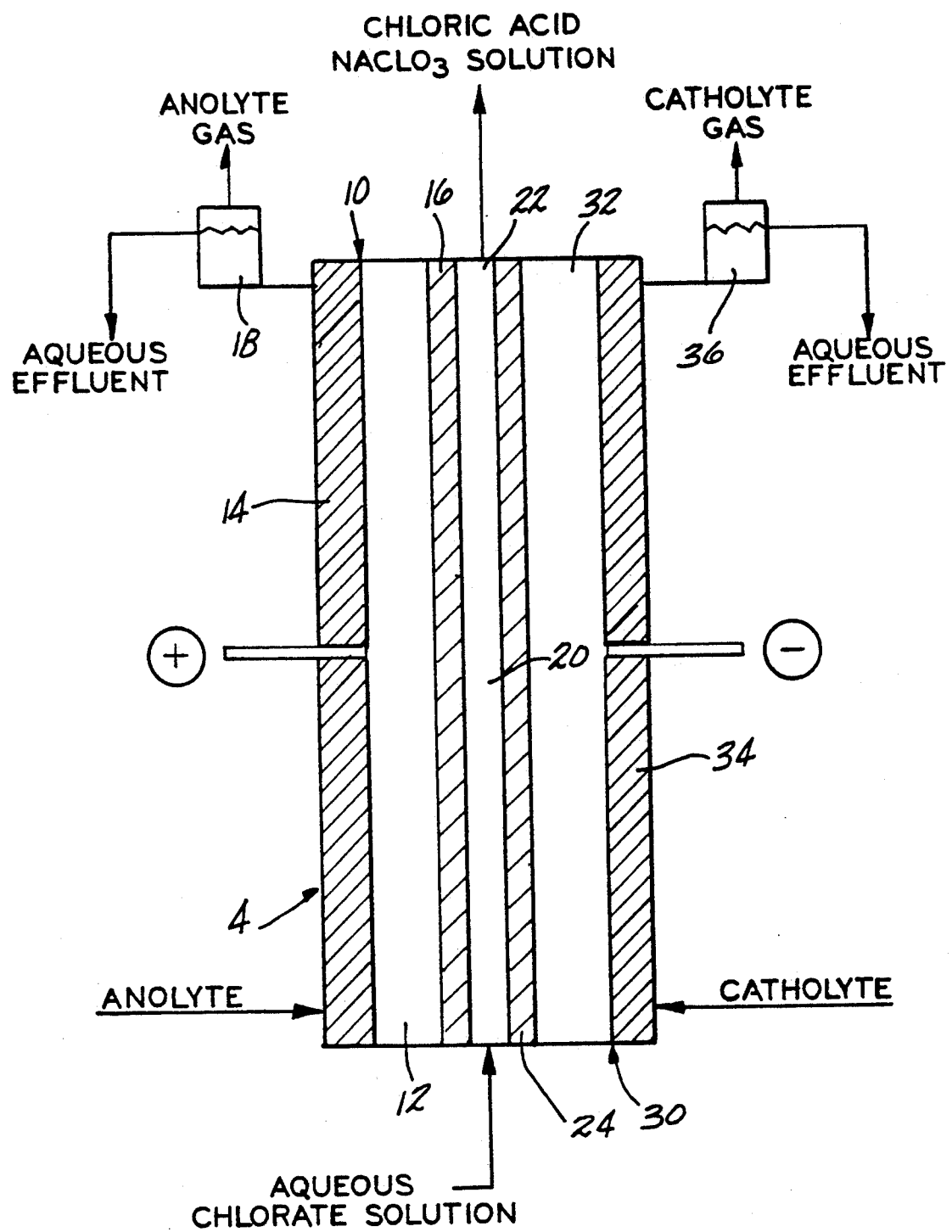
FIG. 1 s a sectional side elevational view of an electrolytic cell which can be employed in the novel process of the invention.

FIG. 1 shows an electrolytic cell 4 divided into anode compartment 10, ion exchange compartment 20, and cathode compartment 30 by cation permeable ion exchange membranes 16 and 24. Anode compartment 10 includes anode 12, and anode spacer 14. Anode spacer 14 positions porous anode 12 with respect to cation permeable ion exchange membrane 16 and aids in the disengagement of anolyte gas produced. Anolyte disengager 18 completes the disengagement of anolyte gas from the spent anolyte solution. Ion exchange compartment 20 includes spacer material 22 which provides a flow channel between cation permeable ion exchange membranes 16 and 24 for the aqueous alkali metal chlorate solution. Cathode compartment 30 includes cathode 32, and cathode spacer 34. Cathode spacer 34 positions cathode 32 with respect to cation permeable ion exchange membrane 24 and aids in the disengagement of catholyte gas produced. The disengagement of catholyte gas from the spent catholyte solution is accomplished in cathode disengager 36.

Figure 2:
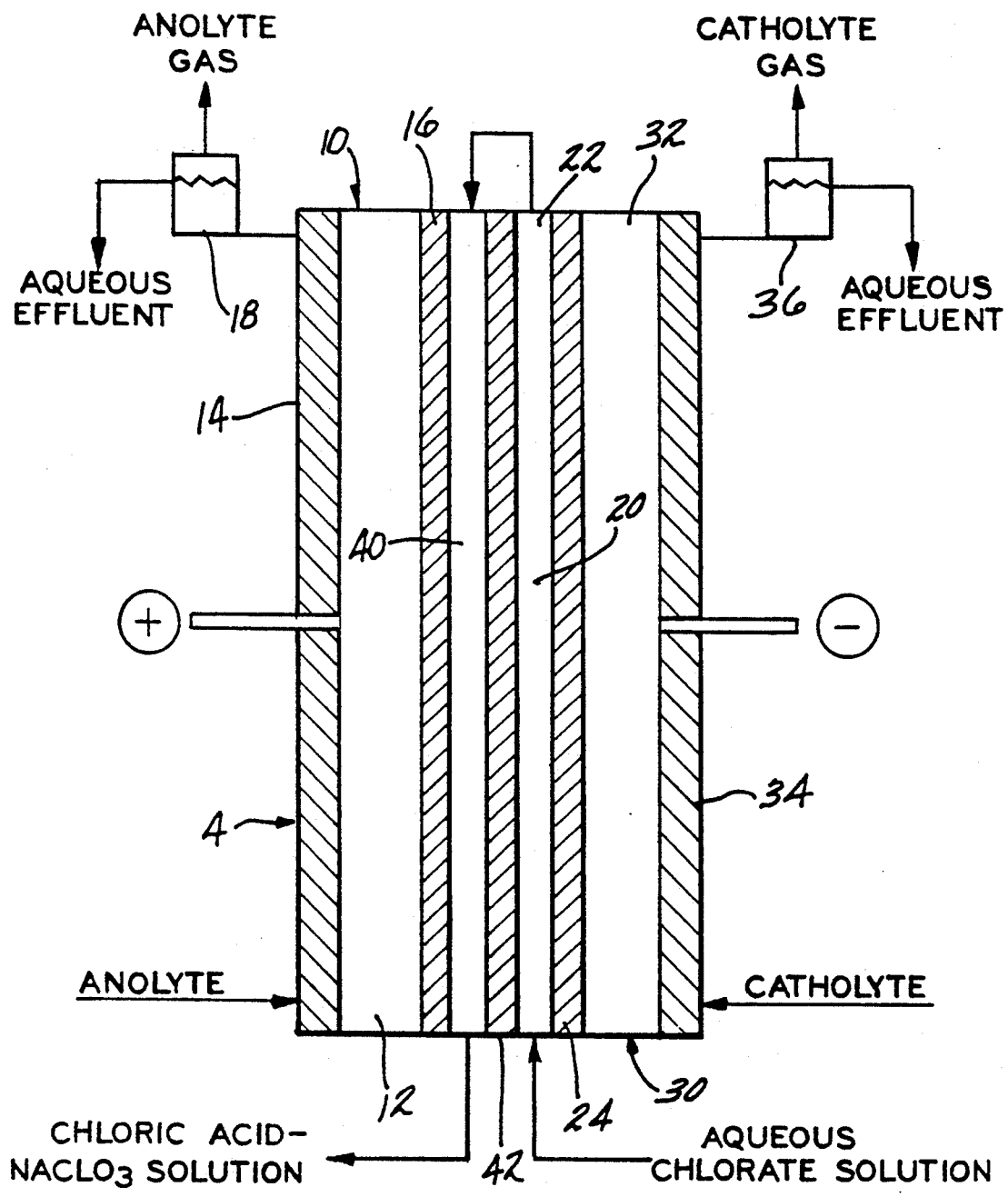
FIG. 2 is a sectional side elevational view of an additional electrolytic cell which can be employed in the novel process of the invention.

In FIG. 2, electrolytic cell 4 has been expanded to include a second ion exchange compartment 40 which is positioned between anode compartment 10 and ion exchange compartment 20. Cation permeable ion exchange membrane 16 separates anode compartment 10 from ion exchange compartment 40. The sodium chlorate feed solution enters the lower part of ion exchange compartment 20, flows upward and out of ion exchange compartment 20 into the upper part of ion exchange compartment 40. The $HClO_3/NaClO_3$ product solution is recovered from the lower part of ion exchange compartment 40.

The flow direction in the ion exchange compartments can also be reversed, for example, with the solution from the top of ion exchange compartment 20 being fed to the bottom of ion exchange compartment 40. The product solution then exits from the top of ion exchange compartment 40.

Figure 3:
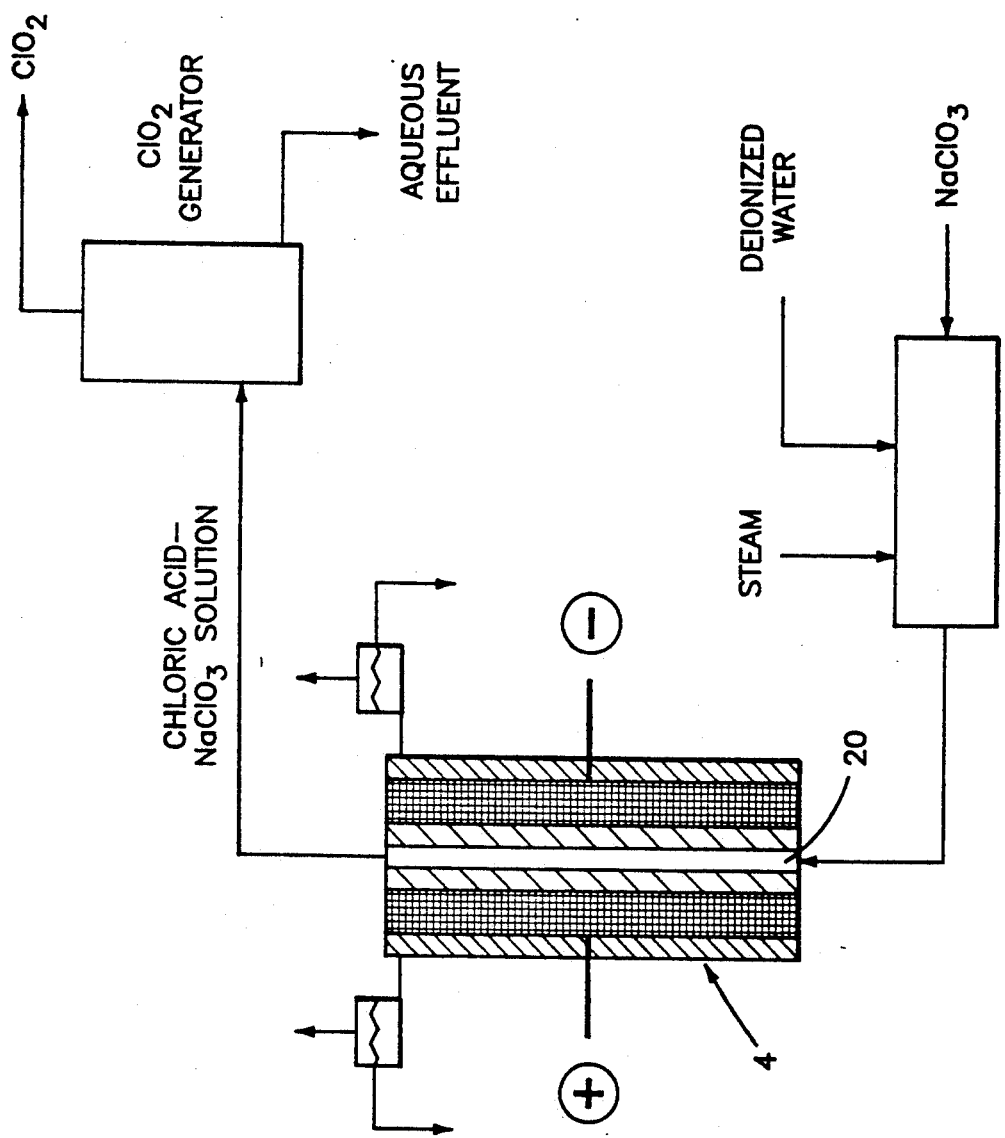
FIG. 3 is a diagrammatic illustration of a system which can be employed in the process of the invention.

In the process depicted in FIG. 3, the $HClO_3/NaClO_3$ solution from ion exchange compartment 20 of electrolytic cell 4 is fed to the $ClO_2$ generator. The sodium chlorate feed solution may be prepared by dissolving $NaClO_3$ in water and feeding to the ion exchange compartment of electrolytic cell 4.

DETAILED DESCRIPTION OF THE INVENTION

An aqueous solution of an alkali metal chlorate is fed to the single or multiple ion exchange compartments of the electrolytic cell. Suitable alkali metal chlorates include sodium chlorate, potassium chlorate and lithium chlorate. In order to simplify the disclosure, the process of the invention will be described using sodium chlorate, which is a preferred embodiment of the alkali metal chlorates. As shown in FIG. 3, the sodium chlorate feed solution may be prepared, for example, by dissolving crystalline sodium chloride in water. Commercial sodium chlorate is suitable as it has a low sodium chloride content and the formation of undesirable amounts of chlorine dioxide in the electrolytic cell is prevented.

Aqueous sodium chlorate feed solutions which may be employed contain any suitable concentrations of sodium chlorate up to about saturation at the temperatures at which the solutions are fed to the ion exchange compartment. For example, the solutions having a concentration in the range of from about 0.1% by weight to those saturated with $NaClO_3$ at temperatures in the range from about 0° C. to about 100° C., and preferably from about 15° C. to about 80° C. Sodium chlorate solutions having a concentration in the range from about 0.1% by weight to about 60% by weight of $NaClO_3$, preferably from about 20% to about 55%, and more preferably from about 30% to about 50% by weight of $NaClO_3$ are also suitable.

The novel process of the invention utilizes an electrochemical cell to generate hydrogen ions that displace or replace a portion of the sodium ions present in the aqueous sodium chlorate solution feed stream.

The generation of hydrogen ions in the process of the present invention in the anode compartment is accompanied, for example, by the oxidation of water on the anode into oxygen gas and $H^+$ ions by the electrode reaction as follows:

$$2H_2O \rightarrow O_2 + 4H^+ + 4e^-$$ 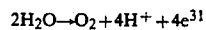

The anode compartment contains an anolyte, which can be an aqueous solution of any non-oxidizable acid electrolyte which is suitable for conducting hydrogen ions into the ion exchange compartment. Non-oxidizable acids which may be used include sulfuric acid, phosphoric acid, perchloric acid and the like. Where a non-oxidizable acid solution is used as the anolyte, the concentration of the anolyte is preferably selected to match the osmotic concentration characteristics of the alkali metal chlorate solution fed to the ion exchange compartment to minimize water exchange between the anode compartment and the ion exchange compartment. Additionally, a solution of hydrochloric acid or a mixture of HCl and an alkali metal choride can be used as the anolyte, which results in a generation of chlorine gas at the anode. Where a chlorine generating anolyte is employed, it is necessary to select a cation exchange membrane as the separator between the anode compartment and the ion exchange compartment which is stable to chlorine gas. The anode compartment may also employ as the anolyte electrolyte a strong acid cation exchange resin in the hydrogen form and an aqueous solution such as deionized water.

Any suitable anode may be employed in the anode compartment, including those which are available commercially as dimensionally stable anodes. Preferably, an anode is selected which will generate oxygen gas.

These anodes include porous or high surface area anodes. As materials of construction for the anodes, metals including platinum, gold, palladium, or mixtures or alloys thereof, or thin coatings of such materials on various substrates such as valve metals, i.e., titanium, can be also be employed. Additionally oxides of iridium, rhodium or ruthenium, and alloys with other platinum group or precious metals could also be employed. Commercially available oxygen evolution anodes of this type include those manufactured by Englehard (PMCA 1500) or Eltech (TIR-2000). Other suitable anode materials include graphite, graphite felt, a multiple layered graphite cloth, a graphite cloth weave, carbon, etc.

The hydrogen ions generated in the anode compartment pass through the cation exchange membrane into the sodium chlorate solution in the ion exchange compartment. As a hydrogen ion enters the solution, a sodium ion is displaced and by electrical ion mass action passes through the cation membrane adjacent to the cathode compartment to maintain electrical neutrality.

The novel process of the invention as operated results in the conversion of sodium chlorate to chloric acid over a wide range, for example, from about 1% to about 99.9%, preferably from about 5% to about 95%, and more preferably from about 15% to about 90%.

The sodium chlorate feed solution concentration, the residence time in the ion exchange compartment as well as the cell amperage are factors that affect the extent of the conversion of sodium chlorate to chloric acid.

Using very dilute solutions of sodium chlorate, high percentages of conversion of $NaClO_3$ to chloric acid can be achieved, i.e., up to 99.9%. For a single pass flow through system, typical residence times in the ion exchange compartment are between about 0.1 to about 120 minutes, with a more preferred range of about 0.5 to about 60 minutes.

Thus the concentration of sodium chlorate in the solution fed to the ion exchange compartment and the flow rate of the solution through the ion exchange compartment are not critical and broad ranges can be selected for each of these parameters.

The novel process of the present invention is operated at a current density of from about 0.01 KA/m2 to about 10 KA/m2, with a more preferred range of about 0.05 KA/m2 to about 3 KA/m2.

Current efficiencies during operation of the process of the invention can be increased by employing additional ion exchange compartments, as illustrated by FIG. 2, which are adjacent and operated in a series flow pattern.

Adjusting the width of the ion exchange compartment can also alter the operating cell voltage and current efficiency. The width, or space between the cation exchange membranes forming the walls of the ion exchange compartment, is in the range of from about 0.1 to about 10, and preferably from about 0.3 to about 5 centimeters.

In an alternate embodiment the ion exchange compartment contains a cation exchange medium. Cation exchange mediums which can be used in the ion exchange compartment include cation exchange resins. Suitable cation exchange resins include those having substrates and backbones of polystyrene based with divinyl benzene, cellulose based, fluorocarbon based, synthetic polymeric types and the like. Where more than one ion exchange compartment is employed, inclusion of the cation exchange medium is optional for each compartment.

Functional cationic groups on these mediums which may be employed include carboxylic acid, sulfonic or sulfuric acids, and acids of phosphorus such as phosphonous, phosphonic or phosphoric. The cation exchange resins are suitably ionically conductive so that a practical amount of current can be passed between the cation exchange membranes used as separators. Various percentage mixtures of resins in the hydrogen form and the sodium form may be used in various sections of the ion exchange compartments on assembly to compensate for the swelling and contraction of resins during cell operation. For example, percentage ratios of hydrogen form to sodium form may include those from 50% to 100%.

The use of cation exchange resins in the ion exchange compartment can serve as an active mediator which can exchange or absorb sodium ions and release hydrogen ions. The hydrogen ions generated at the anode thus regenerate the resin to the hydrogen form, releasing sodium ions to pass into the cathode compartment. Their employment is particularly beneficial when feeding dilute sodium chlorate solutions as they help reduce the cell voltage and increase conversion efficiency.

Preferred as cation exchange mediums are strong acid type cation exchange resins in the hydrogen form as exemplified by low cross-linked resins such as AMBERLITE® IRC-118 (Rohm and Haas Co.) as well as higher cross-linked resins i.e. AMBERLITE® IRC-120. High surface area macro-reticular or microporous type ion exchange resins having sufficient ionic conductivity in the ion exchange compartments are also suitable.

Physical forms of the cation exchange resin which can be used are those which can be packed into compartments and include beads, rods, fibers or a cast form with internal flow channels. Bead forms of the resin are preferred.

Cation exchange membranes selected as separators between compartments are those which are inert membranes, and are substantially impervious to the hydrodynamic flow of the alkali metal chlorate solution or the electrolytes and the passage of any gas products produced in the anode or cathode compartments.

Cation exchange membranes are well-known to contain fixed anionic groups that permit intrusion and exchange of cations, and exclude anions from an external source. Generally the resinous membrane or diaphragm has as a matrix, a cross-linked polymer, to which are attached charged radicals such as $-SO_3^-$ and/or mixtures thereof with $-COOH^-$. The resins which can be used to produce the membranes include, for example, fluorocarbons, vinyl compounds, polyolefins, hydrocarbons, and copolymers thereof. Preferred are cation exchange membranes such as those comprised of fluorocarbon polymers or vinyl compounds such as divinyl benzene having a plurality of pendant sulfonic acid groups or carboxylic acid groups or mixtures of sulfonic acid groups and carboxylic acid groups. The terms "sulfonic acid group" and "carboxylic acid groups" are meant to include salts of sulfonic acid or salts of carboxylic acid groups by processes such as hydrolysis.

Suitable cation exchange membranes are readily available, being sold commercially, for example, by Ionics, Inc., Sybron, by E. I. DuPont de Nemours & Co., Inc., under the trademark "NAFION®", by the Asahi Chemical Company under the trademark "ACIPLEX®", and by Tokuyama Soda Co., under the trademark "NEOSEPTA®". Among these are the perfluorinated sulfonic acid type membranes which are resistant to oxidation and high temperatures such as DuPont NAFION® types 117, 417, 423, etc., membranes from the assignee of U.S. Pat. No. 4,470,888, and other polytetrafluorethylene based membranes with sulfonic acid groupings such as those sold under the RAIPORE® tradename by RAI Research Corporation.

The catholyte can be any suitable aqueous solution, including alkali metal chlorides, and any appropriate acids such as hydrochloric, sulfuric, phosphoric, nitric, acetic or others.

In a preferred embodiment, deionized or softened water or sodium hydroxide solution is used as the catholyte in the cathode compartment to produce an alkali metal hydroxide. The water selection is dependent on the desired purity of the alkali metal hydroxide by-product. The cathode compartment may also contain a strong acid cation exchange resin in a cation form such as sodium as the electrolyte.

Any suitable cathode which generates hydrogen gas may be used, including those, for example, based on nickel or its alloys, including nickel-chrome based alloys; steel, including stainless steel types 304, 316, 310, etc.; graphite, graphite felt, a multiple layered graphite cloth, a graphite cloth weave, carbon; and titanium or other valve metals as well as valve metals having coatings which can reduce the hydrogen overvoltage of the cathode. The cathode is preferably perforated to allow for suitable release of the hydrogen gas bubbles produced at the cathode particularly where the cathode is placed against the membrane.

Optionally a porous spacer material such as a chemically resistant non-conductive plastic mesh or a conductive material like graphite felt can be positioned behind the anode and/or the cathode to support the electrodes and to permit the adjustment of the gap between the electrode and the cation permeable ion exchange membrane, for example, when using high open area expanded metal electrodes. The porous spacer material preferably has large holes for ease of disengagement of the gases from the anolyte and/or catholyte. A thin protective spacer can also be placed between the anode and/or the cathode and the cation permeable ion exchange membranes. This spacer can be a non-conductive plastic or a porous conductive material like graphite felt. The cell may be operated with the electrode in contact with the thin protective spacer and the porous spacer material, or with the membrane in direct contact with the electrode and with or without the porous spacer material.

It will be recognized that other configurations of the electrolytic cell can be employed in the novel process of the present invention, including bipolar cells utilizing a solid plate type anode/cathode or bipolar membranes. For example, a bipolar electrode could include a valve metal such as titanium or niobium sheet clad to stainless steel. The valve metal side could be coated with an oxygen evaluation catalyst and would serve as the anode.

An alternative anode/cathode combination which is commercially available is a platinum clad layer on stainless steel or niobium or titanium and is prepared by heat/pressure bonding.

The novel product solution contains chloric acid and alkali metal chlorate in a wide range of concentrations and ratios of chloric acid to alkali metal chlorate. For example, the solutions produced can provide molar ratios of chloric acid to alkali metal chlorate of from about 0.1:1 to about 250:1. Where the product solutions are to be used for known commerical process for the generation of chlorine dioxide, suitable molar ratios of chloric acid to alkali metal chlorate of from about 0.3:1 to about 200:1, and preferably from about 1:1 to about 100:1.

These solutions are highly acidic and can be used without requiring additional acids, or where additional acids are used, permit a reduction in the amount of acid employed in the generation of chlorine dioxide.

Illustratively, the additional acids used are strong acids, preferably acids having a dissociation constant of about $1 \times 10^{-4}$ or greater or more preferably about $1 \times 10^{-2}$ or greater. These acids can be inorganic mineral acids, such as phosphoric acid including orthophosphoric and pyrophosphoric acid, sulfuric acid hydrochloric acid, nitric acid, chromic acid and chlorosulfonic acid. Other suitable acids are organic types such as oxalic acid, picric acid, methanesulfonic acid, formic acid and the like. An additional suitable strong acid is perchloric acid.

The added acid can also serve as a reducing agent, as in the case of hydrochloric acid, oxalic acid, formic acid, etc. When hydrochloric acid or chlorosulfonic acid are used, chlorine is also evolved with the chlorine dioxide as the acids are oxidized. The preferred reducing agents and acids are those that do not make significant amounts of chlorine in the chlorine dioxide product.

Acid addition is not required for chlorine dioxide generation when the chloric acid in the chloric acid/sodium chlorate mixture provides the necessary acidity for the reaction to occur with the addition of a reducing agent.

Illustrative of the reducing agents that can be used are typical inorganic and organic reducing agents. Inorganic reducing agents are selected from the group of acids such as aqueous hydrochloric acid and gases such as sulfur dioxide, carbon monoxide and anhydrous HCl. Other inorganic reducing agents are selected from the group of peroxides such as hydrogen peroxide and alkali metal peroxides such as sodium peroxide and potassium peroxide. Organic reducing agents are selected from the group of alcohols such as methanol, ethanol, propanol, isopropanol, and higher molecular weight linear and branched alcohols. Other suitable organic reducing agents are slected from the group of carbohydrate sugars such as glucose, sucrose, maltose, and others. An additional group of organic reducing agents are the water soluble carboxylic acids such as formic acid, oxalic acid, lactic acid and their corresponding alkali metal salts such as sodium formate, sodium oxalate, sodium lactate. Another group of suitable reducing agents are the aldehydes such as formaldehyde. In addition, water may serve as the reducing agent when used in combination with an oxygen evolving catalyst.

When the chloric acid-sodium chlorate mixture is used to produce chlorine dioxide, without the addition of another acid, i.e., substantially free of anionic and cationic impurities, it is preferred that the chloric acid concentration in the generator solution be about 1.0 normal or greater, and preferably 2.0 normal or greater. Solutions of these concentrations of $HClO_3$ could be produced directly in the electrochemical cell. However, it may be desirable to concentrate the $HClO_3$ in the product solutions after removal from the cell as crystals of the alkali metal chlorate may be formed during the concentration.

The product solutions may be concentrated, for example, by evaporation at sub-atmospheric pressures and temperatures of less than about 100° C. For example, in the range of from about 30° to about 90° C., and preferably, from about 50° to about 80° C. Solutions containing up to about 50% by weight of chloric acid, and more preferably in the range of from about 30% to about 40% by weight of chloric acid, may be produced in this manner.

Freeze concentration may be used to separate sodium chlorate from the chloric acid solution and thus concentrate the remaining chloric acid simultaneously. As the solution of chloric acid and sodium chlorate is chilled, ice and sodium chlorate will crystallize simultaneously and in separate phases. The solution phase will be enriched in chloric acid and reduced in water content until a eutectic point is reached, at which chloric acid hydrate also crystallizes. This eutectic point is believed to occur at a solution concentration of about 30% to 35% chloric acid by weight. During the practice of freeze concentration, it is also possible to recycle the melted ice along with the sodium chlorate which dissolves as the ice melts for the purpose of preparing additional sodium chlorate solution for feed to the electrolytic cell in the process of this invention.

When the chloric acid-sodium chlorate mixture is used to produce chlorine dioxide, without the addition of another acid, i.e., substantially free of anionic and cationic impurities, it is preferred that the chloric acid concentration in the generator solution be about 1.0 normal or greater, and preferably 2.0 normal or greater. Solutions of these concentrations of $HClO_3$ could be produced directly in the electrochemical cell. However, it may be desirable to concentrate the $HClO_3$ in the product solutions after removal from the cell as crystals of the alkali metal chlorate may be formed during the concentration.

The product solutions may be concentrated, for example, by evaporation at sub-atmospheric pressures and temperatures of less than about 100° C. For example, in the range of from about 30° to about 90° C., and preferably, from about 50° to about 80° C. Solutions containing up to about 50% by weight of chloric acid, and more preferably in the range of from about 30% to about 40% by weight of chloric acid, may be produced in this manner.

Freeze concentration may be used to separate sodium chlorate from the chloric acid solution and thus concentrate the remaining chloric acid simultaneously. As the solution of chloric acid and sodium chlorate is chilled, ice and sodium chlorate will crystallize simultaneously and in separate phases. The solution phase will be enriched in chloric acid and reduced in water content until a eutectic point is reached, at which chloric acid hydrate also crystallizes. This eutectic point is believed to occur at a solution concentration of about 30% to 35% chloric acid by weight. During the practice of freeze concentration, it is also possible to recycle the melted ice along with the sodium chlorate which dissolves as the ice melts for the purpose of preparing additional sodium chlorate solution for feed to the electrolytic cell in the process of this invention.

An alternative embodiment includes a combination of freeze concentration followed by vacuum evaporation to further concentrate the chloric acid.

The novel process of the present invention permits the production of solutions having a wide range of concentrations of chloric acid and sodium chlorate for use in chlorine dioxide generators. As illustrated in FIG. 3, the product solution can be fed directly from the electrolytic cell to a commercial chlorine dioxide generator. Typical commercial processes are those which use sulfuric acid or hydrochloric acid with a reducing agent such as sulfur dioxide or methanol in the presence of a salt such as sodium chloride. Commercial chlorine dioxide processes which may use the aqueous solutions of chloric acid and alkali metal chlorate of the invention include the Mathieson, Solvay, R2, R3, R8, Kesting, SVP, and SVP/methanol, among others.

To increase yields of chlorine dioxide and conversion efficiencies, it is preferred to carry out the process in the presence of solid surface which promotes oxygen evolution. Any solid surface may be used which facilitates oxygen formation including oxygen-evolving catalysts. Suitable as oxygen-evolving surfaces or catalysts are, for example, metals and oxides of the elements of Group VIII of the Periodic Table of Elements (Webster's Third New International Dictionary of the English Language, Unabridged, 1986, page 1680). Thus, metals such as the platinum group metals including platinum, palladium, iridium, rhodium, osmium, or ruthenium; and mixtures or alloys of these platinum group metals may be employed. Additionally, oxides of the platinum group metals as well as mixtures of these oxides with platinum group metals or alloys of these precious metals could be suitably employed. Likewise, iron alloys such as stainless steel, nickel or nickel based alloys, and cobalt based alloys can be used as oxygen evolving catalysts in the process of this invention. Other oxygen-evolving catalysts include semiconductive ceramics known as perovskites. The catalyst may be present as particles suspended in the reaction mixture or supported on an inert substrate. The oxygen evolving cayalysts can be used in the forms of a packed bed, slurries, or any structure which will suitably promote mass transfer. In a preferred embodiment of this invention, the catalyst is supported on valve metal heat exchanger surfaces to facilitate evaporation of water during the reaction. Suitable valve metals include titanium, tantalum, niobium, and zirconium among others.

The process permits flexibility in the by-product salts produced as well as allowing the recovery of energy costs by producing, for example, an alkali metal hydroxide solution by-product. Further, the process reduces operating costs by eliminating process steps and equipment from processes presently available. In addition, novel solutions are produced having a wide range of chloric acid and alkali metal chlorate concentrations which are substantially free of anionic and cationic impurities.

To further illustrate the invention the following examples are provided without any intention of being limited thereby. All parts and percentages are by weight unless otherwise specified.

EXAMPLE 1

An electrochemical cell of the type shown in FIG. 1 consisting of three compartments machined from ultra high density polyethylene (UHDPE) including an anode compartment, a central ion exchange compartment, and a cathode compartment. The ½ inch (1.27 cm.) thick anode compartment contained a titanium mesh anode having an oxygen-evolving anode coating (PMCA 1500 ® Englehard Corporation, Edison, N.J.). The anode was supported and spaced apart from the UHDPE back wall using multiple layers of polyethylene mesh having ¼ inch square holes and being 1/16 inch in thickness. A polyethylene mesh spacer was positioned between the anode and adjoining membrane to provide an anode-membrane gap of 0.0625 inch (0.1588 centimeters). The anode compartment was filled with a 2.0 percent by weight sulfuric acid solution. The ½ inch (1.27 cm.) thick cathode compartment contained a 304 stainless steel perforated plate cathode mounted flush to the surface of the cathode compartment with the polyethylene mesh spacers. The cathode was positioned in contact with the adjacent membrane providing a zero distance gap. The cathode compartment was initially filled with a sodium hydroxide solution (2% by weight) as the catholyte. Separating the anode compartment from the ion exchange compartment, and the ion exchange compartment from the cathode compartment were a pair of perfluorosulfonic acid cation permeable membranes with a 985 equivalent weight, obtained from the assignee of U.S. Pat. No. 4,470,888. The ion exchange compartment was a machined ¼ inch (0.625 cm) thick frame with inlet and outlet and contained the polyethylene mesh spacers to distribute the chlorate solution as well as to support and separate the two membranes.

An aqueous sodium chlorate solution containing 20 weight percent of NaClO3 was prepared by dissolving reagent grade sodium chlorate in deionized water.

During operation of the electrolytic cell, the chlorate solution was metered into the bottom of the ion exchange compartment in a single pass process at feed rates varying from 7.0 g/min. to 14.4 g/min. Electrolyte circulation in the anode and cathode compartments was by gas lift effect only. The cell was operated employing a cell current of 24.5 amperes at a current density of 1.20 KA/m2. The cell voltage varied according to the cell operating temperature. A sample of the product solution was taken at each flow rate, the temperature measured, and the product solution analyzed for chloric acid and sodium chlorate content. The product solutions were colorless, indicating no chlorine dioxide was formed in the ion exchange compartment. The concentration of the sodium hydroxide catholyte during cell operation increased to 12 percent by weight. The results are given in Table I.

density of 1.5 KA/m2. The cell voltage stabilized at 9.60 volts, and the product temperature was 65° C.

Circulation in the anode and cathode compartments of the electrolyte was by gas lift effect and the liquid level of the gas disengagers was set at 3 inches (7.62 cm) above the height of the cell.

The product solution from the cell contained 11.44 weight percent as HClO3 which represented a 90% conversion of the sodium chlorate to chloric acid. The current efficiency was determined to be 61.6% and the power consumption was 4490 KWH/Ton of HClO3. The product solution was light yellow in color, indicating the presence of some chlorine dioxide or chlorine in the chloric acid-sodium chlorate solution product.

EXAMPLE 3

In this example, an electrochemically produced and concentrated chloric acid feed was fed into a chlorine dioxide generating apparatus containing a ruthenium oxide catalyst. The chlorine dioxide was educted into a

TABLE I

| Cell Volts | Cell Amps | NaClO3 Feed Flowrate (gm/min) | Product Temp(C.) | HClO3 Wt % | NaClO3 Wt % | HClO3:NaClO3 Molar Ratio | Conversion % to HClO3 | C.E. % | Residence Time(min) | KWH/TON of HClO3 |
|---|---|---|---|---|---|---|---|---|---|---|
| 5.00 | 24.5 | 14.40 | 30.0 | 5.96 | 12.49 | 0.60 | 38.00 | 69.50 | 11.38 | 2082 |
| 4.87 | 24.5 | 12.35 | 42.0 | 6.51 | 11.80 | 0.70 | 41.00 | 65.20 | 13.27 | 2152 |
| 4.76 | 24.5 | 10.00 | 45.0 | 7.24 | 10.88 | 0.84 | 45.60 | 58.60 | 16.39 | 2336 |
| 4.50 | 24.5 | 7.17 | 50.0 | 8.34 | 9.49 | 1.11 | 52.60 | 48.50 | 22.86 | 2674 |
| 4.44 | 24.5 | 7.00 | 54.0 | 8.43 | 9.38 | 1.13 | 53.10 | 47.80 | 23.41 | 2673 |

EXAMPLE 2

The electrochemical cell of FIG. 2 was employed having a second ion exchange compartment adjacent to the first ion exchange compartment. The anode compartment containing the same type of anode used in Example 1 was filled with a strong acid hydrogen form cation exchange resin (AMBERLITE ® IRC-120 plus, Rohm & Haas Company) as the electrolyte. A perfluorinated sulfonic acid-based membrane (Dupont NAFION ® 417) separated the anode compartment from the first ion exchange compartment. The two ion exchange compartments were fully filled with AMBERLITE ® IRC-120 plus cation exchange resin in the hydrogen form and were separated by a Dupont NAFION ® 417 membrane. The same membrane was employed to separate the second ion exchange compartment from the cathode compartment. The cathode compartment contained a perforated 304 stainless steel cathode, and was filled with a sodium form AMBERLITE ® IRC-120 plus cation exchange resin. Both the anode compartment and the cathode compartment were filled with deionized water. The sodium chlorate solution fed to the ion exchange compartments was prepared from reagent grade sodium chlorate dissolved in deionized water to form a 16 weight percent solution as sodium chlorate. The sodium chlorate solution at 20° C. was fed to the bottom of ion exchange compartment 20 adjacent to the cathode compartment at a flow rate of 6.5 grams per minute. The chloric acid-sodium chlorate solution flow from the upper part of ion exchange compartment 20 was routed into the bottom of ion exchange compartment 40 adjacent to the anode compartment and collected from the top of ion exchange compartment 40. The total residence time of the solution in the ion exchange compartments was about 42 minutes.

During operation of the cell, the cell current was set at a constant 23.0 amperes for an operating current NaOH/H2O2 solution to produce sodium chlorite for analysis of generator performance.

A titanium vessel with an inside diameter of about 3 inches and a height of about 10 inches and having a cone bottom with a bottom exit, a side entrance, and a top exit was used as the chlorine dioxide generating apparatus. A vacuum gauge, themometer, and an eductor, providing a vacuum, were connected to the vessel. The eductor was operated using a solution of NaOH and H2O2 pumped from a tank top to which the effluent from the eductor was returned.

Into the eductor tank, about 500 grams of about 50 wt% NaOH, about 210 grams of H2O2, about 5 grams of MgSO4 and about 14,285 grams of deionized water were added for a total of about 15,000 grams of solution. The chlorine dioxide reactor was charged with about 1000 grams of about 40 wt% HClO4 and about 10 grams of powdered ruthenium oxide (Aldrich Chemical CO.). After applying a vacuum to the reactor, the heater was energized and the power regulated until the temperature was approximately 60° C. and the pressure was approximately 20 inches of mercury vacuum. Then about 606 grams of an electrochemically produced and concentrated chloric acid solution by the methods described in Examples 3 and 4 containing about 43.73 wt% HClO3 and about 4.38 wt% HClO4 with about about 2 wt% sodium content (as Na) was fed continuously to the reactor over about a four hour period. After this time, the feed to the generator was stopped, but generator heating was continued for about 1.5 hours longer until chlorine dioxide generation stopped. Gas produced from the reactor was educted into the product tank solution containing caustic and peroxide to produce sodium chlorite. Samples of the product tank were removed and analyzed iodometrically for sodium chlorite and by silver nitrate titration for chloride. The increase in chlorite concentration was used to monitor generator performance.

The results, which show the chlorine dioxide generator performance and the chloric acid yield conversion to chlorine dioxide, are expressed are as follows in Table II.

TABLE II

| | Reactor Feed | | | | |
|---|---|---|---|---|---|
| Run Time Hours | Solution gm | HClO3 gm | NaClO2 wt % | ClO2 made gm | % YIELD |
| 0 | 0 | 0 | 0 | | |
| 1 | 127 | 55 | 0.33% | 36.91 | 83.2% |
| 2 | 252 | 110 | 0.6% | 67.11 | 76.3% |
| 3 | 438 | 191 | 0.93% | 104.03 | 68.0% |
| 4 | 606 | 265 | 1.28% | 143.18 | 67.6% |
| 5.2 | 606 | 265 | 1.58% | 176.73 | 83.5% |
| 6.5 | 606 | 265 | 1.75% | 195.75 | 92.5% |

| Reactor Contents | Initial | Final |
|---|---|---|
| HClO3 | 0.0% | 0.6% |
| HClO4 | 40.0% | 40.0% |

The scope of the appended claims is intended to encompass all obvious changes in the details, materials, and arrangements of parts, which will occur to one of skill in the art upon a reading of the disclosure.

What is claimed is:

1. A process for producing chlorine dioxide which comprises:
   a) feeding an aqueous solution of an alkali metal chlorate to a first ion exchange compartment of an electrolytic cell having an anode compartment, a cathode compartment and at least one ion exchange compartment between said anode compartment and the cathode compartment,
   b) electrolyzing an anolyte in said anode compartment to generate hydrogen ions,
   c) passing said hydrogen ions from the anode compartment through a cation exchange membrane into the first ion exchange compartment to displace alkali metal ions and produce an aqueous solution of chloric acid and alkali metal chlorate,
   d) passing alkali metal ions from said first ion exchange compartment into said cathode compartment, and
   e) reacting said aqueous solution of chloric acid and alkali metal chlorate with a strong acid having a dissociation constant of $1 \times 10^{-4}$ or greater and a reducing agent to generate chlorine dioxide.

2. A process according to claim 1 which further comprises removing the aqueous solution of chloric acid and alkali metal chlorate from the first ion exchange compartment and feeding said aqueous solution to a second ion exchange compartment prior to removing said aqueous solution from the cell and reacting said aqueous solution with strong acid and reducing agent.

3. The process of claim 2 in which the aqueous solution of chloric acid and alkali metal chlorate from the first ion exchange compartment is fed to the lower part of the second ion exchange compartment.

4. The process of claim 2 in which the aqueous solution of chloric acid and alkali metal from the first ion exchange compartment is fed to the upper part of the second ion exchange compartment.

5. The process of claim 1 in which the alkali metal chlorate is sodium chlorate or potassium chlorate.

6. The process of claim 1 in which the acid has a dissociation constant of $1 \times 10^{-2}$ or greater.

7. The process of claim 1 in which the molar ratio of chloric acid to alkali metal chlorate in the aqueous solution of chloric acid and alkali metal chlorate is in the range of from about 0.1:1 to about 250:1.

8. The process of claim 1 in which the molar ratio of chloric acid to alkali metal chlorate in the aqueous solution of chloric acid and alkali metal chlorate is in the range of from about 0.3:1 to about 200:1.

9. The process of claim 1 in which the strong acid is a mineral acid.

10. The process of claim 9 in the mineral acid is sulfuric, nitric, phosphoric or hydrochloric acid.

11. The process of claim 1 in which the strong acid is an organic acid having a dissociation constant of $1 \times 10^{-4}$ or greater.

12. The process of claim 11 in which the organic acid is formic acid, picric acid, methanesulfonic acid or oxalic acid.

13. The process of claim 1 in which the reducing agent is an inorganic reducing agent or an organic reducing agent.

14. The process of claim 13 in which the inorganic reducing agent is aqueous or anhydrous hydrochloric acid, or sulfur dioxide, or carbon monoxide, or peroxides or alkali metal peroxides.

15. The process of claim 13 in which the organic reducing agent is water soluble linear or branched chain alcohol, or water soluble carbohydrate sugar, or a water soluble carboxylic acids or alkali metal carboxylic acids.

16. The process of claim 15 in which the alcohol is methanol, or ethanol, or propanol or isopropanol.

17. The process of claim 15 in which the water soluble carbohydrate sugar is glucose, sucrose or maltose.

18. The process of claim 15 in which the water soluble carboxylic acid is formic acid, or oxalic acid or lactic acid and their corresponding alkali metal salts.

19. A process for producing chlorine dioxide which comprises reacting an aqueous solution of chloric acid and alkali metal chlorate being substantially free of anionic and cationic impurities and having a molar ratio of chloric acid to alkali metal chlorate from about 0.3:1 to about 200:1 with strong acid and a reducing agent to generate chlorine dioxide.

20. The process of claim 19 in which the strong acid has a dissociation constant of $1 \times 10^{-4}$ or greater.

21. The process of claim 20 in which the strong acid is a mineral acid.

22. The process of claim 21 in which the mineral acid is sulfuric, nitric, phosphoric or hydrochloric acid.

23. The process of claim 19 in which an alkali metal chloride is added to the reaction mixture.

* * * * *